No. 664,393. Patented Dec. 25, 1900.
F. ELLICOTT.
TURBINE WATER WHEEL.
(Application filed May 9, 1898. Renewed Sept. 15, 1900.)

(No Model.) 3 Sheets—Sheet 1.

WITNESSES
Wm H Handy
M R Jones

FRANCIS ELLICOTT
INVENTOR.

BY
Stewart Stewart
ATTORNEY.

No. 664,393. Patented Dec. 25, 1900.
F. ELLICOTT.
TURBINE WATER WHEEL.
(Application filed May 9, 1898. Renewed Sept. 15, 1900.)

(No Model.) 3 Sheets—Sheet 2.

WITNESSES

FRANCIS ELLICOT
INVENTOR.

BY
ATTORNEYS

No. 664,393. Patented Dec. 25, 1900.
F. ELLICOTT.
TURBINE WATER WHEEL.
(Application filed May 9, 1898. Renewed Sept. 15, 1900.)
(No Model.) 3 Sheets—Sheet 3.
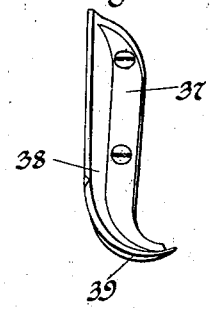
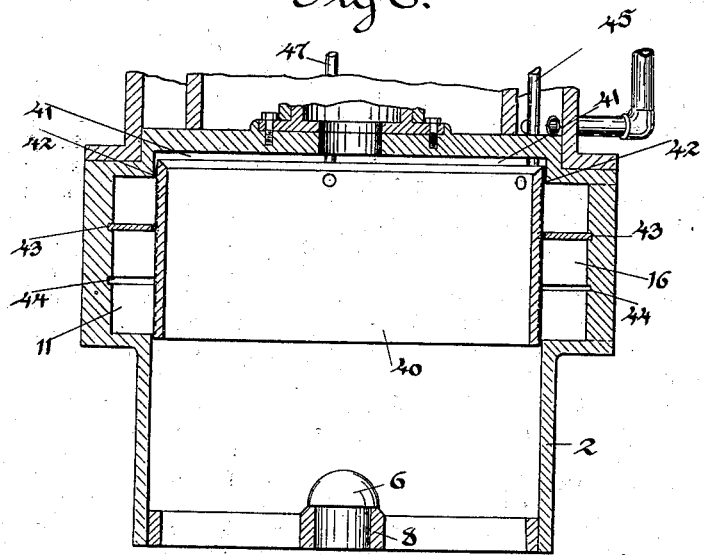

UNITED STATES PATENT OFFICE.

FRANCIS ELLICOTT, OF BALTIMORE COUNTY, MARYLAND.

TURBINE WATER-WHEEL.

SPECIFICATION forming part of Letters Patent No. 664,393, dated December 25, 1900.

Application filed May 9, 1898. Renewed September 15, 1900. Serial No. 30,185. (No model.)

*To all whom it may concern:*

Be it known that I, FRANCIS ELLICOTT, a citizen of the United States of America, and a resident of Baltimore county, in the State of Maryland, (Ruxton P. O.,) have invented certain new and useful Improvements in Turbine Water-Wheels, of which the following is a specification.

My invention consists in a turbine water-wheel and governing mechanism.

The construction and operation of the wheel and its various parts are fully explained in the following specification, reference being had to the accompanying drawings.

Figures 1, 2:
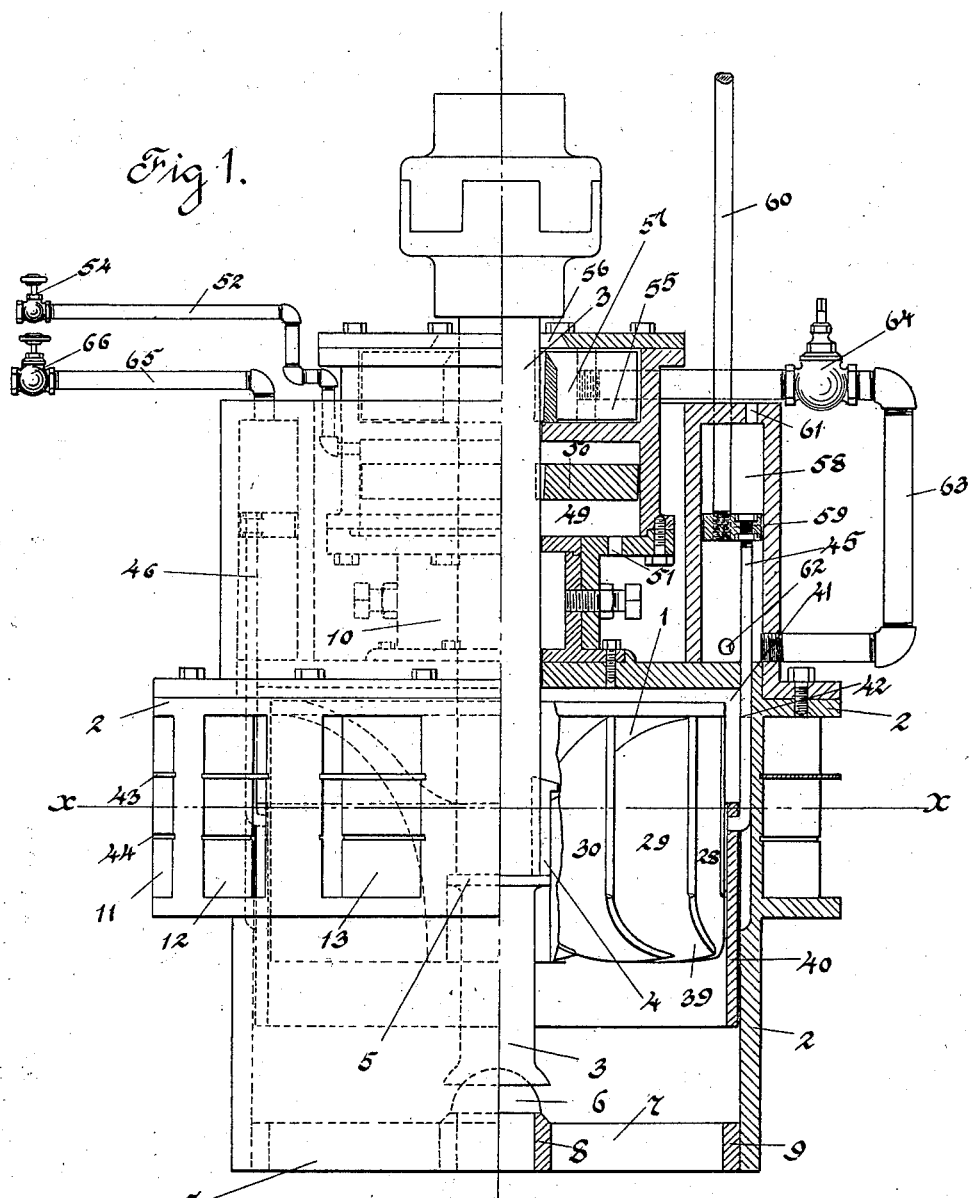
Figure 4:
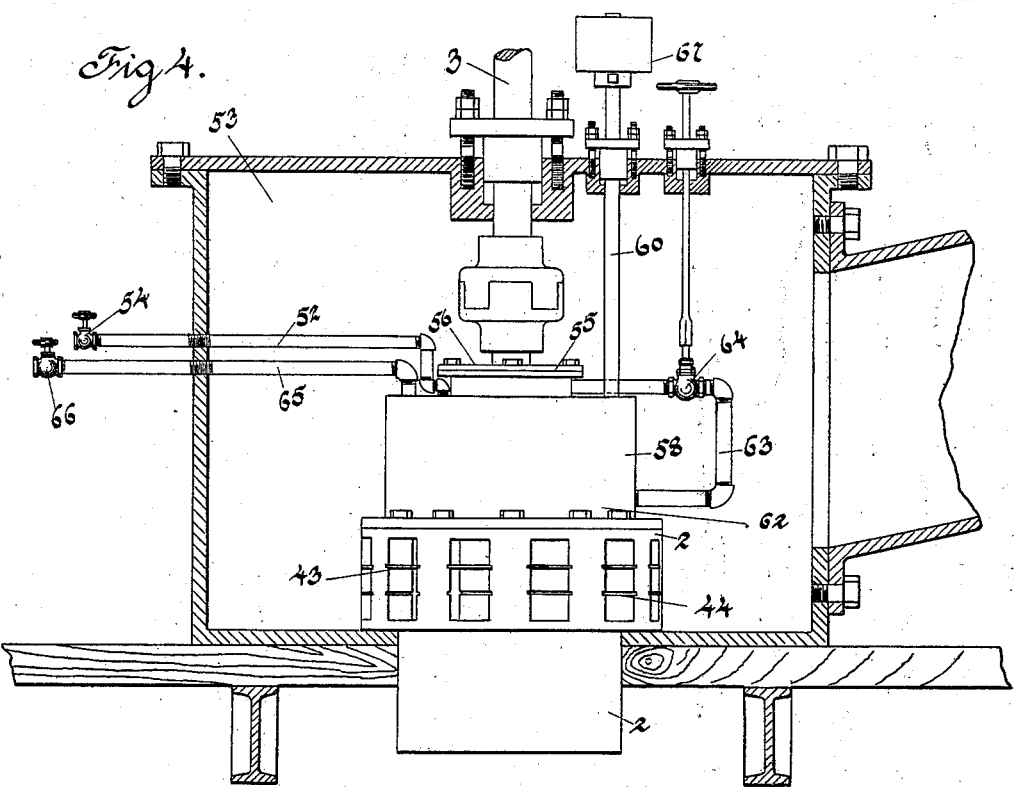
Figure 3:
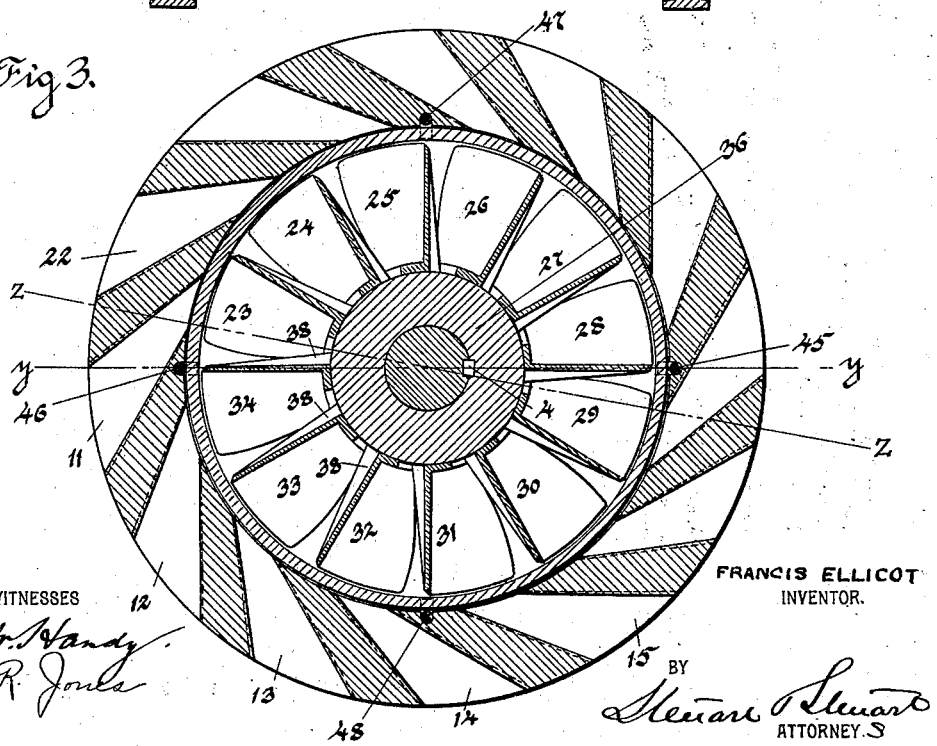

Figure 1 is a side elevation of the wheel and casing, partly in section. Fig. 2 is a side elevation of the runner with one of the buckets attached. Fig. 3 is a sectional plan view of the runner and casing, taken on the line $xx$ of Fig. 1. Fig. 4 is a sectional view through the penstock, showing the wheel in place. Fig. 5 is a perspective view of one of the buckets. Fig. 6 is a sectional view of the gate and casing, taken on line Z Z of Fig. 3.

Referring to Fig. 1, 1 is the wheel proper or "runner," as it is usually termed, and 2 the casing surrounding the wheel. 3 is the wheel-shaft extending through the runner 1 and keyed thereto by the key 4. 5 is a collar on said shaft, which prevents the runner from slipping down out of place. The lower part of the shaft rests on a bearing or toe 6, which is held in a support fastened to the lower part of the casing, as shown. This support has arms 7, extending from the central part 8 to the rim 9. Said arms are thin, thereby offering little or no obstruction to the water as it flows out of the wheel. Supported on the top of the wheel-casing 2 is a bearing 10 for maintaining the shaft and runner in proper alinement. 11, 12, and 13 to 22 are inlets in the casing located at an angle almost tangent to the periphery of the runner and the walls of the inlets being arranged at desired angles. I have found that the highest efficiency is attained by having the opposite walls of the inlets form an angle of about twenty degrees with each other and the whole inlet being so located that the outer edges of the jets of water, which must be parallel to the outer walls of the inlets 11 12 13, &c., enter the runner in a direction approximately tangent to its circumference. 23, 24, and 25 to 34 are the buckets or blades of the runner, which are fastened to the hub 36.

Fig. 2 shows the construction of the hub and the method of attaching the buckets thereto. The hub 36 has a concave conical exterior surface, and each bucket has a rim 37, which exactly conforms with the outside of the hub, the buckets being held in place by screws through the rims, as shown. This construction, however, may be varied, as the buckets may be cast solid with the hub. I have found that the bucket which gives the best results is one with a straight sharp outer edge parallel to the axis of the runner, the blade of the bucket or the part against which the water strikes receding slightly from the edge line as it approaches the bottom near the hub. This feature is shown in Figs. 2 and 3 (marked 38) and in the perspective view, Fig. 5. The bottoms 39 of the buckets are curved, as shown in these figures, the amount of curvature and length of the bottoms varying the area of the space between the end of one bucket and the back of the next. Hence the area of the opening through which the water flows out at the bottom of the runner may be varied by changing the curvature or the length of the bottoms of the buckets.

Referring again to Fig. 1, 40 is the wheel-gate made in the form of a cylinder surrounding the runner, water being admitted to the runner by lowering and shut off by raising the gate. I have found in practice that if the cylindrical gate rises against a flat surface leaves and other debris will gather upon its upper edge, and unless some provision is made to clear away this obstruction the gate will leak and the wheel will always have a tendency to turn, besides wasting much valuable water, and in attempting to close the wheel by force the parts are often strained or broken. To obviate this, I extend the walls of the casing 2 upward above the tops of the inlets 11 12 13, &c., thereby forming an upper chamber 41 in the casing, into which chamber the upper part of the gate 40 enters when closed. This construction is better shown in Fig. 6, in which the gate is shown in its extreme closed position, and it is evident that to reach this position its upper edge must have passed the top wall or roof of the inlets 11 12 13, &c., at the point 42, at which point the gate makes a shearing contact, thereby shearing off sticks and debris of any kind which may gather between the top of the gate and the casing at 42. In the vertical sides of the inlets or nozzles 11 12 13, &c., are grooves 44, and plates 43 are inserted in these grooves, said plates being of the same shape as the tops and bottoms of the inlets or nozzles, thereby dividing each inlet into two or more smaller parallel inlets. In the drawings the inlets are shown divided into two parts, one division-plate 43 being put into each inlet.

Referring to Fig. 6, the plates 43 are seen to extend to the inner surface of the casing 2, and it is evident that the gate when closing makes shearing contact with the plates just as it does at the point 42, thereby shearing off any debris which may collect between it and the plates.

I preferably put a number of grooves in the sides of the inlets, the number of plates being varied to suit the different conditions of the water and load under which the wheel operates. For example, the wheel, as shown in the drawings, has grooves in the inlets for two plates. If the wheel runs most of the time at about one-third full load, and it is desirable to have the efficiency of the wheel high at this low load with a limited water-supply, and it is necessary to reserve as much water as possible in the dam or reservoir, so that there will be a sufficient supply to run the wheel during the time that the full load is on, by placing the plates 43 in the upper grooves, as shown in the drawings, the efficiency of the wheel is brought up very high for a low-gate opening, thereby making it possible to run the wheel with a less amount of water than if the plates were not used. This I believe to be due to the fact that the eddies in the inlets 11 12, &c., caused by the water entering the wheel are very much decreased, since when the gate is on a level with the plates 43 the water under the plates is in a state of comparative rest, the current being all above the plates. If the average load on the wheel is higher, it may be found best to put the plates in the lower grooves 44, and if the wheel runs for considerable periods at about one-third or two-thirds full load it may be best to use two sets of plates, one in the upper and one in the lower grooves. The arrangement of the plates may be varied at any time to suit changes in the running of the wheel.

In addition to the division-plates in the inlets for raising the efficiency at low-gate openings the efficiency may be further raised by increasing the curvature of the bottoms of the buckets, and therefore decreasing the opening for the outflowing water at the bottom of the runner. For example, I have found that a wheel of a certain efficiency at full gate may be made to produce very nearly the same efficiency at one-third gate if in addition to the division-plates in the inlets a set of buckets be used whose bottoms are curved, so as to decrease the area of the openings at the bottom of the runner a proportional amount. I have found that if the openings at the bottom of the runner be decreased so that they bear the same proportion to the gate opening above the division-plates in the inlets as the opening at the bottom of the runner used with full-gate opening, then the efficiency of the wheel is very nearly the same as at full gate with the first set of buckets. In wheels where the buckets are detachable, as shown in the drawings, two sets of buckets may be supplied with a wheel, one set giving a large and the other a small opening at the bottom of the runner. This makes it possible at times of low water to substitute the second set of buckets, and thus raise the efficiency of the wheel, so that it will run at nearly the same efficiency at low gate as at full gate.

The construction of the outside case and the runner is illustrated in Fig. 3, which is a sectional view of Fig. 1 on the line $x\ x$. The grooves in the sides of the inlets 11 12 13, &c., are shown by the dotted lines. 36 is the wheel-hub, keyed to the shaft 3 by the key 4, and 23 24 25, &c., the buckets arranged about the hub. The gate 40 is raised and lowered by means of the rods 45, 46, 47, and 48, which move in grooves in the wheel-case, as shown in Figs. 1 and 3.

In many large wheels where the shafts are vertical the weight supported by the toe 6 is very great, thereby causing excessive wear and loss of power by friction. To counterbalance the weight of the shaft and runner, I have provided the following mechanism:

Referring to Fig. 1, 49 is a hollow cylinder fastened to the bearing 10, and 50 a disk secured to the shaft 3 about midway of the cylinder, said disk having a slightly-less diameter than the cylinder to permit water to pass from the lower to the upper part of the cylinder. This disk may also be perforated for the same purpose. 51 is a hole in the bottom of the cylinder communicating directly with the water under pressure around the wheel. 52 is a pipe leading from the upper part of the cylinder 49 to the outside of the penstock 53, (illustrated in Figs. 1 and 4,) said pipe having a valve 54 in it for regulating the amount of water which will flow out through the cylinder 49, due to the water-pressure surrounding the wheel in the penstock. The water-pressure on the upper side of the disk 50 is decreased as the quanty of water drawn off through the pipe 52 is increased, the pressure on the lower side of the piston 50 remaining the same, since the opening 51 is quite large. Hence by opening the valve 54 to a sufficient extent the pressure can be decreased on the upper side of the disk 50 until the effective upward pressure on the lower side of the disk is sufficient to balance the weight of the wheel and shaft, thereby relieving the pressure on the toe 6 and avoiding the wear of the toe and loss of power by friction. Above the cylinder 49 is a chamber 55, which communicates with the water in the penstock or with some exterior source of water under pressure by means of the opening 56. Fastened to the shaft 3 and contained within the chamber 55 is a centrifugal pump 57. I do not limit myself, however, to the use of a centrifugal pump, as any type of pump connected to the wheel would operate in a similar manner. Surrounding the cylinder 49 is a cylindrical chamber with inner and outer walls 58, constructed as shown in Fig. 1 and fastened to the upper part of the wheel case. Within this chamber is a ring-shaped piston 59, which is connected directly to the gate 40 by means of the rods 45 46, &c. 60 is the gate-stem, which is connected to the ring-piston 59 and extends upward through the end of the cylinder 58 and the penstock, so that the gates may be moved by any suitable gearing, if desired, said gearing being so arranged as to be readily detached from the gate-stem. Both ends of the hollow cylinder are connected to the water inside of the penstock by means of the holes 61 and 62. 63 is a pipe connecting the lower part of the cylinder 58 with the pump 57, said pipe having a valve 64 in it for controlling the flow of water from the centrifugal pump 57 to the cylinder 58, any variation of the flow producing a change of pressure. 64 has a valve-rod extending to the outside of the penstock 53, as shown in Fig. 4, thus making it possible to operate the valve from the outside. The water delivered by the pump into the cylinder 58 causes an additional pressure on the lower side of the piston 59, said pressure varying as the speed of the pump. Since both ends of the cylinder 58 are in direct communication with the water surrounding the wheel in the penstock by the holes 61 and 62, the piston 59 is balanced so far as the pressure due to the penstock-water is concerned. From the upper part of cylinder 58 a pipe 65 leads to the exterior of the penstock, as shown in Figs. 1 and 4, said pipe having a valve 66 in it. Supported on the gate-stem 60 is a balance-weight 67, (shown in Fig. 4,) which is preferably located upon the exterior of the penstock, as shown. This weight may be put in different positions from that shown in Fig. 4—for example, suspended from the bottom of the gate—or the gate itself may be made sufficiently heavy to make any additional weight unnecessary. The outflow of water through the valve 66 causes the water-pressure on the upper side of the ring-piston 59 to be less than that on the under side. The centrifugal pump runs constantly and at the speed of the runner. Hence on the under side of the piston 59 there is the additional pressure due to the pump, and the weight 67 is provided to counterbalance this pressure and that of the penstock. If, however, any of these pressures are varied, the balance becomes disturbed and the piston 59 and gate 40 move either up or down, according as the pressure is greater on the lower or upper side of the piston. The device becomes, therefore, an automatic governor.

The operation of the governing device is as follows: When the valve 66 is opened wide, the pressure above the piston drops, and the pressure exerted by the weight 67 being less than the pressure exerted by the penstock-water on the lower side of the piston said piston will rise and close the gate 40. To start the wheel, the valve 66 is partially closed, thereby increasing the pressure on the upper side of the piston 59, by which it will be forced down and the gate 40 opened. The gate will continue to open until the pressure on the lower side of piston 59 caused by the penstock-pressure and the pump 57 balances the pressure above. It will be readily seen from the above description that by the proper adjustment of the valves 64 and 66 the piston 59 will be balanced and it and the gate stop moving when the wheel reaches the desired speed. Now if the wheel be running at the desired speed, with the valves 64 and 66 set and with the gate balanced in the position shown in Fig. 1, and the load increase the speed of the wheel and pump will decrease. Therefore the pressure on the lower side of the piston 59, due to the pump 57, will decrease, thereby destroying the balance. The weight 67 will push the gate 40 down, open the inlets wider, and admit more water to the wheel. The speed will rise until the pressure due to pump 57 on the lower side of the piston 59 is the same as it was before the change in load occurred, when the piston will be again balanced and the gate held stationary, with the wheel running at its normal speed. If the load is decreased, the speed of the wheel and pump 57 will increase, thereby raising the pressure on the lower side of piston 59, which will cause it to rise, raising with it the gate and shutting off the water from the wheel until it and the pump 57 have returned to their normal speed, when the piston will be again balanced and the gate held stationary.

Having thus fully described my invention, what I desire to claim and secure by Letters Patent is—

1. In a turbine water-wheel the combination, of a casing provided with water-inlets, with a runner, said inlets being divided into sections by removable partitions inserted in grooves in the side walls of said inlets to limit their area, substantially as described.

2. In a turbine water-wheel the combination of a casing provided with water-inlets with a runner, said inlets being arranged at such an angle that the exterior wall of the inlets will be approximately tangent to the periphery of the runner, and being divided into sections by removable partitions, inserted in grooves in the side walls of said inlets to limit their area, substantially as described.

3. In a turbine water-wheel the combination, of a casing provided with water-inlets, said inlets being divided into sections by removable partitions located therein on a plane at right angles to the axis of the runner, a cylindrical gate descending to open and ascending to close and a runner, substantially as described.

4. In a turbine water-wheel the combination, of a casing provided with water-inlets, said inlets being divided into sections by removable partitions, a cylindrical gate descending to open and ascending to close, and a runner, the buckets of which are located so as to receive water from the inlets at their tops when the gate is first opened, substantially as described.

5. In a turbine water-wheel the combination, of a casing having a series of water-inlets, said inlets being provided with removable partitions extending to the inner surface of the casing, a cylindrical gate within the casing which descends to open and ascends to close, an upper chamber in the top of the casing into which the gate enters to close and with the edge of which and with the inner ends of the removable partitions, it makes a shearing contact and a runner within the gate, substantially as described.

6. In a turbine water-wheel, a casing having water-inlets, said inlets being provided with removable partitions and a runner provided with removable buckets, said partitions and buckets being changed to increase or decrease the size of the inlets and the size of the escape-openings from the runner, so as to maintain the same relation between them at varying gates.

7. In a turbine water-wheel the combination, of a runner, a casing having inlets which deliver the water to the runner, said inlets being divided into a number of parallel sections by division-plates, the number of which may be varied, a cylinder gate between the runner and the casing, said gate being arranged to admit water to the runner by lowering the gate, a cylinder supported on the casing of the wheel having a piston in it connected to the gate, said piston being normally balanced by pressure on either side and adapted to move the gate when the balance is disturbed.

8. In a turbine water-wheel the combination, of a runner, a casing having inlets which deliver the water to the runner, said inlets being divided into a number of parallel inlets by division-plates, the number of which may be varied a cylinder gate between the runner and the casing, said gate being arranged in such a way that water is admitted to the runner by lowering the gate, a cylinder supported on the casing of the wheel having a piston in it connected to the gate, said piston being normally balanced by pressure on either side and adapted to move the gate when the balance is disturbed, and a second cylinder surrounding the wheel-shaft, said cylinder inclosing a piston fastened to the shaft, the piston being subjected to water-pressure above and below, the pressure from below being sufficiently greater than the pressure from above to support the runner and shafting.

9. The combination in a turbine water-wheel of a cylinder gate, a piston connected to the gate, said piston being normally held in a state of balance between opposing forces, a cylinder surrounding the piston having both ends in direct communication with the water in the penstock, a weight supported by the gate-stem, a centrifugal pump connected to the wheel-shaft and delivering water to one end of the cylinder, and an outlet from the other end of the cylinder, all being arranged substantially as described and in such a way that any variation in the speed of the pump disturbs the balance of the piston and moves the gate in the proper direction to bring the speed back to normal.

10. The combination in a turbine water-wheel, of a casing for the water-wheel, a cylinder open at both ends to penstock-pressure, a cylindrical gate within the casing, a piston within the cylinder to which the cylindrical gate is connected, and by which it is operated, and a pump delivering water into the cylinder at one end, the discharge of the pump being controlled by the speed of the water-wheel.

11. The combination in a turbine water-wheel of a casing for the water-wheel, a cylinder, a cylindrical gate within the casing, a piston within the cylinder to which the cylindrical gate is connected and by which it is operated and a pump delivering water into the cylinder at one end, the discharge of the pump being controlled by the speed of the water-wheel and means for relieving the pressure in the cylinder created by the pump, and an outlet-valve in the opposite end of the cylinder.

12. In a turbine water-wheel the combination of a casing for the wheel with a cylinder that is open at both ends to fluid-pressure, a piston in said cylinder which is balanced between pressures, a cylindrical gate within the casing suspended from the piston, and a variable outlet from the cylinder to the exterior of the penstock to relieve pressure on one side of the piston and means for controlling the outlet, substantially as described.

13. In a turbine water-wheel the combination of a casing for the wheel with a cylinder which is open at both ends to penstock-pressure, a piston in said cylinder, a cylindrical gate within the casing suspended from the piston, an outlet in the top of the cylinder to the exterior of the penstock to relieve penstock-pressure above the piston and thereby to balance the weight of the gate and the piston, and means delivering pressure below the piston, the discharge of which is controlled by the speed of the wheel.

Signed by me at Baltimore city, Maryland, this 5th day of May, 1898.

FRANCIS ELLICOTT.

Witnesses:
 GEORGE KENT,
 ALFRED R. RIGGS.